A. R. NEFF.
INDEX HEAD.
APPLICATION FILED APR. 16, 1918
1,377,720.
Patented May 10, 1921.
2 SHEETS—SHEET 1.
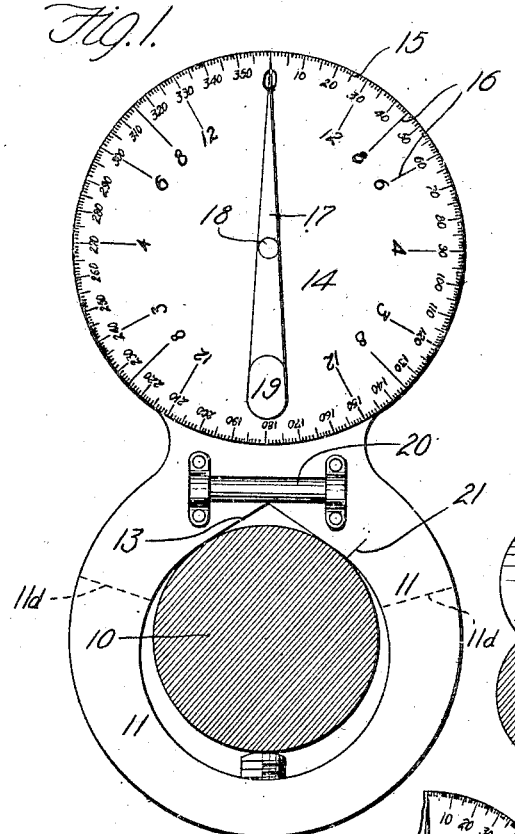
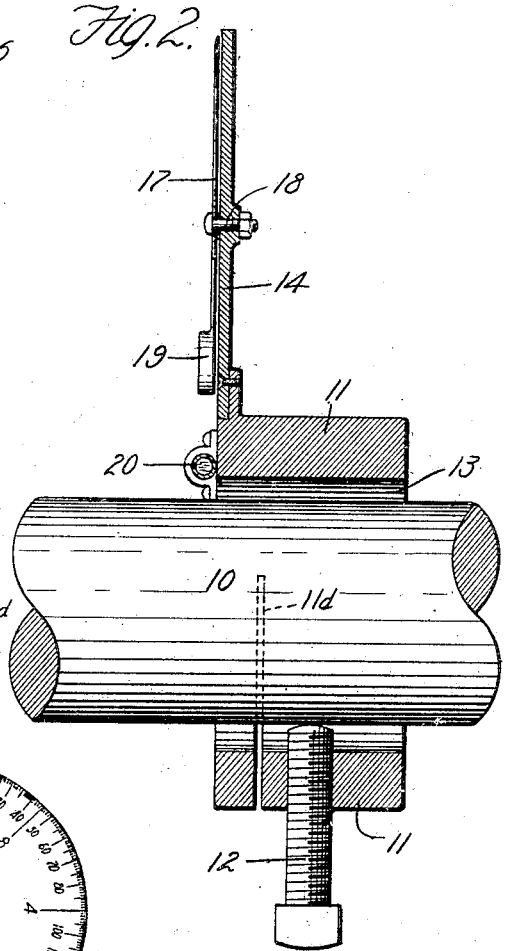
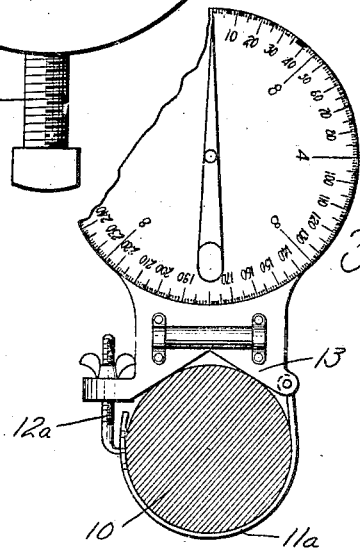
Inventor
Abner R. Neff
by James T. Barleens
his Attorney A. R. NEFF.
INDEX HEAD.
APPLICATION FILED APR. 16, 1918.
1,377,720.
Patented May 10, 1921.
2 SHEETS—SHEET 2.
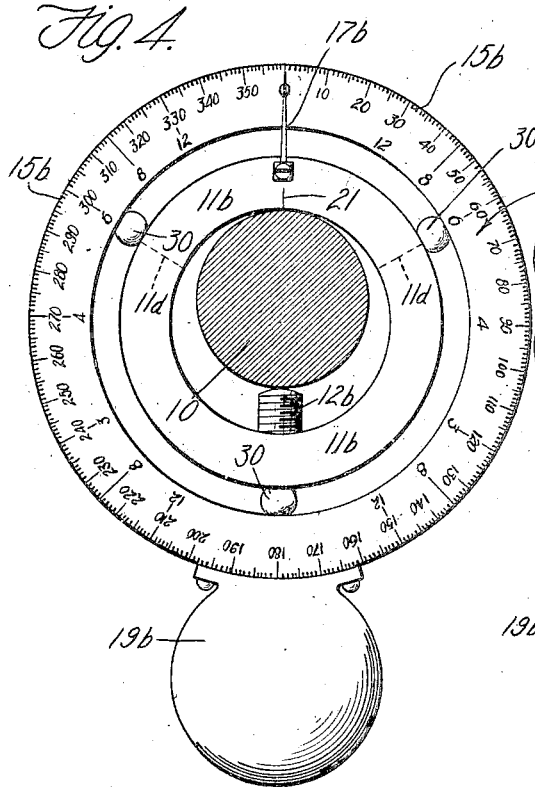
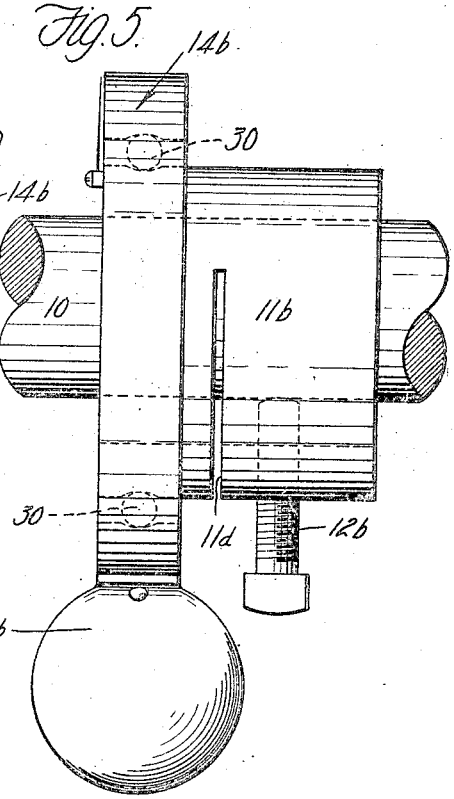
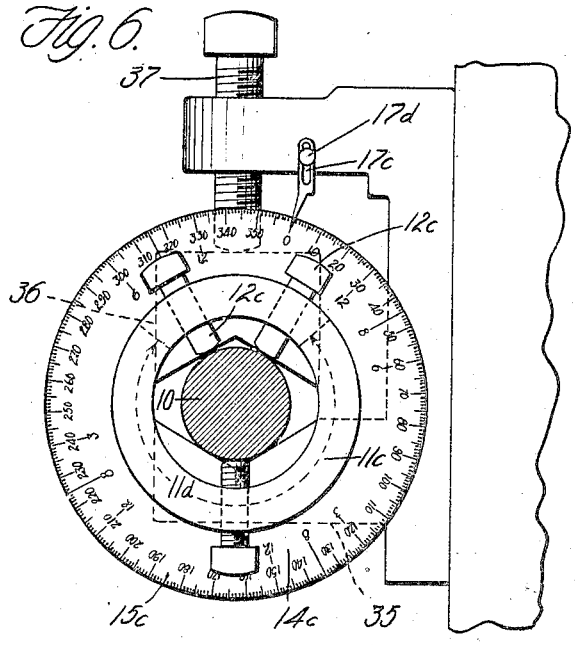
Inventor
Abner R. Neff
by James T. _____
his Attorney

UNITED STATES PATENT OFFICE.

ABNER R. NEFF, OF LOS ANGELES, CALIFORNIA.

INDEX-HEAD.

1,377,720.  Specification of Letters Patent.  Patented May 10, 1921.

Application filed April 16, 1918. Serial No. 228,982.

*To all whom it may concern:*

Be it known that I, ABNER R. NEFF, a citizen of the United States, residing at Los Angeles, in the county of Long Beach, State of California, have invented new and useful Improvements in Index-Heads, of which the following is a specification.

This invention relates to index heads; and relates particularly to an index head adapted to be used in connection with such a lathe attachment or milling device as shown in Patent No. 1,216,600, issued to James H. Pashall on February 20, 1917; although it will be easily understood that this invention is not limited at all to such particular use but is useful in connection with milling machines, lathes, drill presses, and all other kinds of machinery wherein it is desired to determine relative positions on shafts, etc., upon which work is being done.

This invention has for its object the provision of a simple, inexpensive and effective form of index head of sufficient accuracy for all ordinary classes of work. It is also an object to provide such an index head, as herein explained, adapted to be placed directly upon the work (the shaft or the like being worked upon) and to accurately indicate different relative positions of that shaft. For instance, if the end shaft is being squared, it is first placed in the holder or chuck and one side of the square is cut. The shaft is then turned through an angle of 90° and another cut taken. It is the function of this index head to indicate the position the shaft should be put to be in position 90° from its original position. This method of operation may be applied to any operations carried out upon a shaft or other article.

My index head employs, in its preferred form, an indexing member which is capable of being clamped upon the shaft. And it further preferably employs a gravity actuated indicator means (a weighted indicator arm or the like, or a weighted graduated circle) which will always give an indication with reference to verticality. The method of use of the device, and the features of construction of the device, will be best understood from the following description in detail of preferred forms of the device; reference for this purpose being had to the accompanying drawings in which—

Figure 1 is an elevation showing my device in place upon a shaft; Fig. 2 is a longitudinal vertical section showing the same; Fig. 3 is an elevation showing a modified form of device; Fig. 4 is an elevation showing a further modified form of device; Fig. 5 is a side elevation of the form shown in Fig. 4; and Fig. 6 is an elevation showing a further modified form of device and illustrating its use upon a shaft or the like which is clamped in a work holder of the type shown in patent referred to.

Referring first to Figs. 1 and 2 of the drawings I show therein a shaft 10 around which a ring clamp 11 is placed, this clamp being provided with any suitable clamping means, as a set screw 12. The upper part of this ring clamp 11 has a V-shaped portion 13 into which the shaft 10 is forced by clamping screw 12; and this V-shaped portion properly alines the shaft in position with reference to the indexing mechanism. This alinement is convenient for certain purposes although it is not necessary as will be hereinafter described. Upon the ring clamp 11 I secure in any suitable manner a dial plate 14 which carrier on its edge portions a circular scale 15 graduated to degrees; and this dial also has suitable graduations, as indicated at 16, which are numbered to indicate thirds, quarters, sixths, eighths, twelfths, etc., of a circle. A pointer 17 is supported upon a suitable pivot 18 at the center of the dial; and this pointer is weighted at 19 with a suitable heavy weight so that it will always remain accurately in a vertical position. The pivot at 18 may be made in any manner suitable to allow the pointer free pivotal movement. The pointer 17 is preferably made with a light upper end so that the lower end is more preponderantly weighted.

In addition to this indexing means I may also place upon the clamp 11 a spirit level bulb 20 in order to indicate position of true verticality.

Now in using this form of device the index head is clamped on the work and the work is put in the machine and clamped in any suitable holder (as in the work holder shown in Fig. 6). For the beginning operation it is convenient that the work shall be so placed, or the clamp so placed upon it, that the pointer will register with the zero mark on the scale; but it will be obvious that this is not necessary, as the pointer may register with any indication on the scale. Work may then be done upon the shaft 10, or upon any other piece of material upon which index head is mounted. If it is then desired to do further work at a certain definite and known angle with relation to the work first done, then the work is turned in the work holder, and the index head is turned with the work, until the indicator hand or pointer 17 registers with the desired angle designation on the divided scale. This operation may be repeated as many times as desired. Different operations may thus be carried out in any predetermined definite angular relation to each other. For instance, key ways may be cut at right angles or opposite to each other or in a line with each other upon a shaft. The end of the shaft may be squared or formed into a hexagon or octagon, or equilateral triangle, or any other regular form desired. In order to facilitate handling of the work, if it is necessary or desirable at any time to take the index head off the shaft after being once placed thereon, I may place upon the clamp 11 a mark 21, and the work may be center punched immediately below the mark 21; so that the index head may always be accurately replaced upon the work if it is necessary to remove it.

Now while it is convenient for some operations to have the center of the shaft always in alinement with the center 18 and with the zero mark on the dividing scale, this is not necessary. Due to the construction and the principal of operation of the instrument, it is immaterial where the shaft is with relation to the dial. The readings on the dial may be taken relatively from one angle indication to another and do necessarily have to be taken from the zero mark as a beginning point.

In Fig. 3 I show the same form of index head equipped with a clamp comprising the upper V-shaped part 13 and a clamp strap 11$^a$ which is held around the work by a screw or bolt 12$^a$.

In Figs. 4 and 5 I show a further modified form of device in which the shaft or other work 10 is held in a clamp ring 11$^b$ by a clamping screw 12$^b$. This clamp ring 11$^b$ carries a pointer 17$^b$ which projects outwardly and registers over graduations 15$^b$ on an outer ring 14$^b$ which is revoluble around and concentrically with relation to the inner clamp ring 11$^b$. In order to provide free revolution of the ring 14$^b$, I may place ball bearings 30 between the two rings; and the outer ring 14$^b$ is preferably weighted at 19$^b$ with any suitable weight to keep it in a true vertical position. As in the other form of device before explained, it is of no particular consequence that the center of the work, the center of a shaft 10, be accurately in alinement with the center of the concentric parts and with the zero mark on the graduated scale. The same operations may be carried out with this form of device as with the other.

In Fig. 6 I show a further modified form of device in which a clamping ring 11$^c$ is concentrically clamped by suitable clamp screws 12$^c$ around the work, as onto the shaft 10. This clamp ring 11$^c$ carries directly thereon a circular dial plate 14$^c$ having the same indications 15$^c$ as hereinbefore described. The work 10 is held in a vise or clamp or holder of any kind, as for instance a holder comprising a lower jaw 35 and an upper jaw 36 held down by a clamp screw 37. This form of device is similar to that explained in the Letters Patent hereinbefore referred to. Upon a part of the work holder I then mount an adjustable stationary pointer 17$^c$ which will indicate the relative angular position to which the work is turned. This pointer 17$^c$ may be so mounted, as indicated at 17$^b$, as to be adjustable to register properly with the graduations on the dial plates. In this form of device it is desirable that the center of the shaft be centered in the dial plate and in the clamp ring 11$^c$; and for this purpose three clamping screws 12$^c$ are provided. With the three clamping screws the work may be accurately centered; or these clamping screws may be provided with the well known self centering means (the device indicated at 11$^c$, 12$^c$, may be in effect what is commonly known as a self-centering chuck). In fact such an arrangement may be used on any of the forms of this device.

In the form shown in Fig. 4 it may be desirable to provide a slit at 11$^d$ extending somewhat more than half way up around the sleeve or ring 11$^b$ so that the strain imposed by screw 12$^b$ on the ring will not expand that portion of the ring which forms the race for balls 30. This slit may also be applied to the other forms herein described, if so desired, for the general purpose of preventing deformation of the part of the ring which carries the indexing parts.

I have described these various forms of my device in some particularity and detail for the purpose of rendering my invention intelligible and not for the purpose of limiting my invention to any specific details of construction. I therefore reserve to myself all such changes and modifications as may occur to those skilled in the art, or as may fall within the scope of the following claims.

Having described preferred forms of my invention, I claim:

1. An index head for indicating relative angular positions of work to which it is attached, consisting exclusively of a member adapted to be clamped upon the work and gravity controlled angle indicating means connected to said member, said angle indicating means comprising a relatively movable graduated circle and indicating pointer.

2. An index head for indicating relative angular positions of work to which it is attached, consisting exclusively of a ring adapted to be clamped upon the work and gravity controlled angle indicating means connected to said ring, said angle indicating means comprising a relatively movable graduated circle and indicating member adapted to operate as a pointer on said circle, one of said angle indicating members being weighted so as to be gravitationally controlled.

3. An index head for indicating relative angular positions of work to which it is attached, consisting exclusively of a member adapted to be clamped upon the work and gravity controlled angle indicating means connected to said member, said angle indicating means comprising a graduated circle and a weighted indicating member adapted to operate as a pointer on said circle.

4. In an index head for indicating relative angular positions of work to which it is attached and in combination, a clamping ring, a clamp screw therein adapted to bear against the work within the ring, said ring having a circumferential slit extending around that side near the clamp screw, and gravity controlled angle indicating means on said ring comprising a graduated circle and indicating member adapted to operate as a pointer on said circle, said circle and indicating member being relatively movable.

5. In an index head for indicating relative angular positions of work to which it is attached and in combination a clamping ring, a clamp screw therein adapted to bear against the work within the ring, said ring having a circumferential slit extending around that side near the clamp screw, and gravity controlled angle indicating means on said clamping ring comprising a graduated circle and a weighted pointer thereon movable relatively thereto.

In witness that I claim the foregoing I have hereunto subscribed my name this 6th day of April, 1918.

ABNER R. NEFF.

Witness:
VIRGINIA I. BERINGER.